United States Patent Office 3,194,793
Patented July 13, 1965

3,194,793
POLYURETHANES CURED WITH MIXTURES OF AROMATIC PRIMARY AND SECONDARY DIAMINES
Irving C. Kogon, Wilmington, Del., assignor to E. I. du Pont de Nemours and Company, Wilmington, Del., a corporation of Delaware
No Drawing. Filed Dec. 13, 1961, Ser. No. 159,164
8 Claims. (Cl. 260—77.5)

This invention relates to a novel process for curing isocyanate-terminated polyether polyurethanes. More particularly this invention relates to novel curing agents for curing isocyanate-terminated polyether polyurethanes.

Polyurethane elastomers are commercially important today as materials for the preparation of a wide variety of molded articles. A very attractive and useful representative example of these polyurethane elastomers is made by curing a NCO-terminated polyether polyurethane with an aromatic primary diamine.

For some applications it is desirable that the polyurethane vulcanizate be relatively soft, that is, exhibit a Shore A Hardness ranging between about 60 and 70. Although satisfactory polyether elastomers of this type can be made using aromatic primary diamines as curing agents, it is desirable for some applications that these soft primary diamine cured elastomers display better tensile strength and tear strength.

It is, therefore, an object of the present invention to provide novel curing agents for NCO-terminated liquid polyurethane polymers. It is a further object of the present invention to provide novel cured polyether polyurethane polymers exhibiting excellent tensile strength and tear strength while having a Shore A Hardness in the range of about 60 to about 70. A still further aim is to provide a process for preparing such polyurethane polymers. Other objects will appear hereinafter.

These and other objects of this invention are accomplished by providing a cured polyether polyurethane elastomer obtained by a process comprising reacting (A) a liquid polyisocyanate composition with (B) at least one aromatic primary diamine and (C) at least one aromatic secondary diamine; the molar ratio of (B):(C) ranging from 5.7:1 to 0.33:1; the aromatic primary diamine (B) and the aromatic secondary diamine (C) together supplying about 0.8 to about 1.1 amine ($-NH_2$ and $>NH$) groups for every NCO-group supplied by the polyisocyanate composition (A); said polyisocyanate composition being made by reacting a molar excess of at least one organic polyisocyanate with at least one polyether having on the average about 2–3 HO-groups per molecule and a molecular weight of about 700–6000, and, optionally, no greater than 10% by weight of polyol reactants of at least one aliphatic polyhydric compound.

Another preferred embodiment of this invention is a cured polyether polyurethane elastomer obtained by reacting a liquid polyisocyanate composition with at least one aromatic primary diamine, at least one aromatic secondary diamine and minor proportions of at least one aliphatic polyol; the molar ratio of the aromatic primary diamine to the aromatic secondary diamine being from 0.33:1 to 5.7:1; the aliphatic polyol reacting with up to 15% of the NCO-groups of said polyisocyanate composition and the primary and secondary diamines reacting with at least 65% of the NCO-groups of said polyisocyanate composition, the sum of the number of reacted amino groups and hydroxyl groups being at least 80% of the number of NCO-groups of said NCO-terminated polyurethane; said liquid polyisocyanate composition being made by reacting a molar excess of at least one organic polyisocyanate with at least one polyether having on the average about 2–3 HO-groups per molecule and a molecular weight of about 700 to 6000.

Still another embodiment of this invention resides in the novel diamine mixture which consists of at least one aromatic primary diamine and at least one aromatic secondary diamine, the molecular ratio of the primary to the secondary ranging from 5.7:1 to 0.33:1.

The essence of the present invention resides in a mixture of selected aromatic diamines and its use as a curing agent for a liquid polyisocyanate composition which is prepared from an organic polyisocyanate, a polyether polyol, and if desired, a relatively low-molecular weight aliphatic polyol compound. By employing this combination of the selected aromatic diamine mixture as a curing agent it is possible to obtain a cured polyether polyurethane polymer which exhibits a remarkable combination of tensile strength, superior tear strength, and relatively low Shore A Hardness. As has been pointed out above it has been well-known to use aromatic primary diamines as curing agents for liquid isocyanate compositions. It was, however, entirely unexpected that the substitution of a selected aromatic secondary diamine for part of the aromatic primary diamine would permit one to obtain cured ployether polyurethanes displaying exceptionally enhanced tensile strength and tear strength. The exceptional improvement obtained is readily obvious from the representative data which are given in the table which follows:

| Polymer Property | Primary Diamine Cured [1] | Primary/Secondary Diamine Cured [2] |
|---|---|---|
| $M_{300}$, lb./sq. in | 750 | 1,125 |
| $E_B$, Percent | 430 | 360 |
| $T_B$, lb./sq. in | 3,000 | 5,600 |
| Shore A Hardness | 65 | 65 |
| Compression Set, Percent | 10 | 11 |
| Tear Strength, lb./sq. in | 12 | 50 |

[1] Polymer B, described in the Examples, cured with 4,4'-methylene-bis (2-chloroaniline) at 160° C. for 20 hours.
[2] Example 9.

In addition to affording superior polyurethane vulcanizates, the novel mixtures of the present invention provide enhanced operating convenience. In general, the pot life of the polyisocyanate composition containing the diamine mixture of this invention is longer than that of the same polyisocyanate composition containing only aromatic primary diamines as curing agents. In addition many of the diamine mixtures have melting points far below that of the aromatic primary diamines contained therein and, in some cases, are liquid at room temperature. For example, 4,4'-methylene-bis(2-chloro-aniline) melts at about 100° C.; however, a mixture containing about 37.5% of it and 62.5% of N,N'-diphenyl ethylenediamine melts at about 40° C. 4-ethyl-1,3-phenylenediamine and N,N'-diphenyl-1,3-propylenediamine, which are both normally liquid compounds, form a particularly convenient mixture to use in curing polyisocyanate compositions.

The aromatic secondary diamines which are useful in the present invention are selected from those diamines having the following general characteristics: each has, as its sole isocyanate-reactable functionality, two secondary amino groups wherein one valence of each amino nitrogen atom is attached to an aromatic ring and another valence of each amino nitrogen atom is attached to an aliphatic carbon atom (preferably a lower aliphatic carbon atom). The amino groups may be on the same or on different aromatic rings.

Representative examples of the secondary diamines wherein both amino groups are attached to the same aromatic ring include the following compounds: N,N'-dimethyl-1,3-toluenediamine; N,N'-di-sec-butyl-1,3-toluenediamine; N,N'-di-sec-butyl-1,3-phenylenediamine; N-N'-di-sec-butyl-1,4-phenylenediamine; N,N'-di-n-hexyl-1,4-phenylenediamine; N,N'-dibenzyl-1,4-phenylenediamine; N-isopropyl, N'-isobutyl-1,4-phenylenediamine, N,N'-di-isopropyl-1,4-phenylenediamine; N-methyl, N'-isobutyl-1,4-phenylenediamine. Representative examples of secondary diamines wherein the amino groups are situated on different aromatic rings include the following compounds: N,N'-diphenylethylenediamine, which is preferred; N,N' - diphenyl - 1,3 - diaminopropane; N,N' - diphenyl-2,3-butanediamine; N,N'-di-o-tolylethylenediamine; N,N'-di-o-tolyl-1,4-xylydiamine. Further examples include 4,4'-methylene bis(N-alkyl aniline) compounds such as 4,4'-methylene bis(N-methyl aniline); 4,4'-methylene bis(N-sec-butyl aniline); 4,4'-methylene bis(2-chloro-N-methyl aniline); 4,4'-methylene bis(2-methyl-N-ethyl aniline); and 4,4'-methylene bis(2-methoxy-N-isopropyl aniline).

Mixtures of two or more of any of these secondary diamines in any proportion can be employed in the present invention. Other aromatic secondary diamines useful in the present invention are listed in U.S. Patent 2,888,440 at column 3, lines 69–75 and column 4, lines 1–29. Unsymmetrical N,N'-di substituted ethylene diamines useful in the present invention are described in U.S. Patent 2,913,496.

The preferred aromatic primary diamines which may be employed in the present invention may be represented by the structural formula

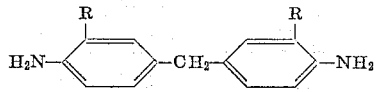

wherein R is selected from the group consisting of halogen, alkyl and lower alkoxy. The halogen radicals include chlorine, bromine, fluorine and iodine with chlorine being preferred. The number of carbon atoms present in the alkyl radical is not critical, however, the preferred alkyl radicals contain not more than about 8 carbon atoms. Representative preferred arylene diamines are 4,4'-methylenebis(2-chloroaniline);
4,4'-methylenebis(2-bromoaniline);
4,4'-methylenebis(2-iodoaniline);
4,4'-methylenebis(2-fluoroaniline);
4,4'-methylenebis(2-methoxyaniline);
4,4'-methylenebis(2-ethoxy-aniline);
4,4'-methylenebis(2-methylaniline);
4,4'-methylene-bis(2-ethylaniline);
4,4'-methylenebis(2-isopropylaniline);
4,4-methylenebis(2-n-butylaniline);
and 4,4'-methylenebis(2-n-octylaniline).

Other aromatic diamines which may be used include compounds such as:

bis(4-aminophenyl)sulfone;
bis(4-aminophenyl)disulfide;
toluene-2,4-diamine;
1,5-naphthalenediamine;
cumene-2,4-diamine;
4-methoxy-1,3-phenylenediamine;
1,3-phenylenediamine;
4-chloro-1,3-phenylenediamine;
4-bromo-1,3-phenylenediamine;
4-ethoxy-1,3-phenylenediamine;
2,4'-diaminodiphenylether;
5,6-dimethyl-1,3-phenylenediamine;
2,4-dimethyl-1,3-phenylenediamine;
4,4'-diamiodiphenylether;
benzidine;
4,6-dimethyl-1,3-phenylenediamine;
4,4'-methylenedianiline;
9,10-anthracenediamine;
4,4'-diaminodibenzyl;
2,4-diaminostilbene;
1,4-anthradiamine;
2,5-fluorenediamine;
1,8-naphthalenediamine;
2,6-diaminobenzfuran;
3,3'-diphenyldiamine;
2-methylbenzidine;
2,2'-dimethylbenzidine;
3,3'-dimethylbenzidine;
2,2'-dichloro-3,3'-dimethylbenzidine;
5,5'-dibromo-3,3'-dimethylbenzidine;
2,2'-dichlorobenzidine;
2,2'-dimethoxybenzidine;
3,3'-dimethoxybenzidine;
2,2',5,5'-tetramethylbenzidine;
2,2'-dichloro-5,5'-diethoxybenzidine;
2,2'-difluorobenzidine;
3,3'-difluorobenzidine;
3-ethoxybenzidine;
3-ethyl-3'-methylbenzidine;
2,2',6,6'-tetrachlorobenzidine;
2,2',6,6'-tetrafluorobenzidine;
3,3',5,5'-tetraiodobenzidine;
3-trifluoromethylbenzidine; and
2-iodobenzidine. Mixtures of two or more of any of these primary diamines in any proportion can be employed in the present invention.

The novel curing agents of the present invention consist of at least one of the above-mentioned aromatic primary diamines and of at least one of the aromatic secondary diamines. In order that the polyether polyurethane elastomers cured by these diamines display outstanding tensile strength and tear resistance, the value of the molar ratio of the primary diamines to the secondary diamines in the novel mixture should range from about 5.7:1 to 0.33:1, 0.6:1 to 1:1 being preferred. Mixtures having a higher proportion of the aromatic primary diamines (mole ratio of primary:secondary diamine greater than 5.7:1) are less useful; as the proportion of primary diamines in the novel mixture is increased, the products obtained therefrom more and more resemble the conventional primary diamine cured elastomers. When the diamine mixture contains more than 75 mol percent of the aromatic secondary diamine (mole ratio of primary:secondary less than 0.33), unsatisfactory vulcanizates are obtained which exhibit high compression set and decreased tensile strength. When improved impact resistance or minimum hardness is desired, it is preferred that the proportion of aromatic secondary diamine approach 75 mol percent.

The diamine mixtures of the present invention can be used in combination with minor proportions of at least one aliphatic polyol when it is desired to obtain polyurethanes displaying improved heat aging resistance. Enough polyol is supplied to react with up to 15%, preferably 5–15%, of the number of available NCO-groups of the liquid polyisocyanate composition. The amount of amine groups present is at least 65% and preferably less than 100% of the number of available NCO-groups when a polyol is present. The total number of amine and hydroxyl groups which react is at least 80%, generally 80–100%, of the number of available NCO-groups. It is to be understood that the number of HO-groups supplied by the polyol may exceed 15% of the number of available NCO-groups; in this case sufficient diamine is provided so that no more than 15% of the NCO-groups are left to react with these HO-groups. The amino groups, being more reactive than the HO-groups, are substantially completely consumed; the HO-groups react with the NCO-groups that are left. The excess unreacted polyol can remain in the vulcanizate as a plasticizer (see Example 16). The polyols frequently have molecular weights between 92 and about 350, but the value may range at least as high as 1000. There are at least 3 alcoholic hydroxyl groups per molecule; other isocyanate-reactable groups are absent.

Representative examples of polyols having at least 3 hydroxyl groups include: glycerol; 1,2,6-hexanetriol; 1,1,1-trimethylolpropane; 1,1,1-trimethylolethane; pentaerythritol; 3-(2-hydroxyethoxy)-1,2-propanediol; 3-(2-hydroxypropoxy) - 1,2 - propanediol; 6 - (2 - hydroxyethoxy)-1,2-hexanediol; 6-(2-hydroxypropoxy)-1,2-hexanediol and 2,4-dimethyl-2-(2-hydroxyethoxy)-methylpentanediol-1,5; mannitol; galactitol; talitol; iditol; allitol; altritol; gulitol; arabitol; ribitol; xylitol; lyxitol; erythritol; threitol; 1,2,5,6-tetrahydroxyhexane; meso-inositol; sucrose; glucose, galactose; mannose; fructose; xylose; arabinose; dihydroxyacetone; glucose-α-methylglucoside; 1,1,1-tris[(2-hydroxyethoxy)methyl]ethane; 1,1,1-tris[(2-hydroxypropoxy)methyl]propane; castor oil; polyalkylenether polyols such as (a) the polyhydric compounds, described in Australian application 52,266/59, made by condensing a $C_{2-5}$ alkylene oxide and a triol or tetrol, or (b) polypropylenether polyols, described in Belgian Patent 582,075, made by condensing 0.25–50 parts of 1,2-propylene oxide and 1 part of a hexitol (e.g. sorbitol).

The novel curing agents of the present invention can be made by mixing the aromatic diamines in any order according to the methods familiar to those skilled in the art. As has been pointed out above, the mixtures themselves generally melt below the melting point of the primary diamine; hence, it is usually convenient to mix the amines prior to curing the NCO-terminated polyether polyurethane. However, the mixture can be made in situ by introducing the various aromatic diamines into the polyisocyanate composition to be cured. The novel mixtures can be stored at room temperature indefinitely. It is to be understood that some of the liquid mixtures made from high melting components may crystallize in part on long standing at room temperature.

The novel polyurethane polymers of the present invention can be prepared by a number of procedures including either sequential or simultaneous mixing of the reactants described above in accordance with the above-defined proportions. Thus, these polyurethane polymers can be made by mixing together at one time a polyisocyanate composition, the aromatic primary diamine, and the aromatic secondary diamine and reacting the mixture thereby obtained.

In a representative alternative procedure, a molar excess of an organic polyisocyanate is partially reacted with a polyether polyol so as to form a mixture of an isocyanate-terminated polyurethane polymer, unreacted polyether polyol, and free monomeric organic polyisocyanate; a cure with the aromatic diamine mixture then follows. The amount of diamine supplied is based on the number of —NCO groups initially supplied by the organic polyisocyanate minus the total number of hydroxyl groups provided by the polyol. On account of the insolubility of the aromatic primary diamines in mixtures containing a substantial proportion of free monomeric organic diisocyanate, it is not desirable to prepare the novel polyurethane polymers by simultaneous mixing of an organic polyisocyanate, a polyether polyol, and a diamine mixture.

In preparing the polyurethane polymers of the present invention, any of a wide variety of polyisocyanates may be employed either alone or as isomer mixtures or as mixtures of different polyisocyanates. Aromatic, aliphatic and cyclo-aliphatic diisocyanates and combinations of these types are useful. Arylene diisocyanates, i.e. those in which each of the two isocyanate groups is attached directly to an aromatic ring, are preferred.

Representative polyisocyanate compounds include toluene-2,4-diisocyanate;
1,4-tetramethylenediisocyanate;
1,6-hexamethylenediisocyanate;
1,10-decamethylenediisocyanate;
1,5-naphthalenediisocyanate;
cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4'-diisocyanatodiphenylether;
5,6-dimethyl-1,3-phenylenediisocyanate;
2,4-dimethyl-1,3-phenylenediisocyanate;
4,4'-diisocyanatodiphenylether;
benzidinediisocyanate;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6-dimethyl-4,4'-diisocyanatodiphenyl;
2,4-diisocyanatostilbene;
3,3'-dimethyl-4,4'-diisocyanatodiphenyl;
3,3'-dimethoxy-4,4'-diisocyanatodiphenyl;
1,4-anthracenediisocyanate;
2,5-fluorenediisocyanate;
1,8-naphthalenediisocyanate;
1,3-phenylenediisocyanate;
methylenebis(4-phenylisocyanate);
2,6-diisocyanatobenzfuran;
2,4,6-toluenetriisocyanate and
2,4,4'-triisocyanatodiphenylether.

Other representative organic isocyanates include: polyisocyanates (described in U.S. Patent 2,683,730); organic diisocyanates (described in U.S. Patent 2,292,443); organic triisocyanates (described in U.S. Patent 2,929,794). Mixtures of any of the foregoing organic polyisocyanates can be employed when desired.

The polyether polyol reactants should have a number average molecular weight between about 700 and 6000. The useful polyether polyols are polyalkyleneether glycols, polyalkylene-aryleneether glycols, polyalkyleneether-thioether glycols, and polyalkylenearyleneether-thioether glycols and polyalkyleneether triols. Polyalkyleneether glycols are preferred. Mixtures of the polyols may be used when desired.

The polyalkyleneether glycols may be represented by the formula $HO(RO)_nH$ wherein R is an alkylene radical which need not necessarily be the same in each instance and $n$ is an integer. Representative glycols include polyethyleneether glycol, polypropyleneether glycol, polytrimethyleneether glycol, polytetramethyleneether glycol, polypentamethyleneether glycol, polydecamethyleneether glycol, polytetramethyleneformal glycol and poly-1,2-dimethylethyleneether glycol. Mixtures of two or more polyalkyleneether glycols may be employed if desired. The use of polyalkyleneether glycols in the formation of polyurethane polymers is described in U.S. Patent 2,929,800.

Representative polyalkyleneether triols are made by reacting one or more alkylene oxides with one or more low molecular weight aliphatic triols. The alkylene oxides most commonly used have molecular weights between about 44 and 250. Examples include:

ethylene oxide;
1,2-propylene oxide;
1,2-epoxybutane;
1,2-epoxyhexane;
1,2-epoxyoctane;
1,2-epoxyhexadecane;
2,3-epoxybutane;
3,4-epoxyhexane;
1,2-epoxy-5-hexene; and
1,2-epoxy-3-butene.

Ethylene and propylene oxide are preferred. In addition to mixtures of these oxides, minor proportions of alkylene oxides having cyclic substituents may be present such as styrene oxide, cyclohexene oxide, 1,2-epoxy-2-cyclohexylpropane, and α-methyl styrene oxide. The aliphatic triols most commonly used have molecular weights between about 92 and 250. Examples include glycerol; 1,2,6-hexanetriol; 1,1,1-trimethylolpropane; 1,1,1-trimethylolethane; 2,4-dimethyl-2-methylol-pentanediol-1,5 and the trimethylether of sorbitol. Representative examples of the polyalkyleneether triols include: polypropyleneether triol (M.W. 700) made by reacting 608 parts of 1,2-propyleneoxide with 92 parts of glycerine; polypropyleneether triol (M.W. 1535) made by reacting 1401 parts of 1,2-propyleneoxide with 134 parts of trimethylolpropane; polypropyleneether triol (M.W. 2500) made by reacting 2366 parts of 1,2-propyleneoxide with 134 parts of 1,2,6-hexanetriol; and polypropyleneether triol (M.W. 6000) made by reacting 5866 parts of 1,2-propyleneoxide with 134 parts of 1,2,6-hexanetriol. Further examples of these polyalkyleneether triols are given in U.S. Patent 2,866,774.

The polyalkylene-aryleneether glycols are similar to the polyalkyleneether glycols except that some arylene radicals are present. Representative arylene radicals include phenylene, naphthalene and anthracene radicals which may be substituted with various substituents, such as alkyl groups. In general, in these glycols there should be at least one alkyeneether radical having a molecular weight of about 500 for each arylene radical which is present. Polyurethane polymers prepared from these polyalkylene-aryleneether glycols are described in U.S. Patent 2,843,568.

The polyalkyleneether-thioether glycols and the polyalkylene-aryleneether glycols are similar to the above-described polyether glycols except that some of the ether-oxygen atoms are replaced by sulfur atoms. These glycols may be conveniently prepared by condensing together various glycols, such as thiodiglycol, in the presence of a catalyst, such as p-toluene-sulfonic acid. The use of these glycols in the formation of polyurethane polymers is described in U.S. Patent 2,900,368.

The aliphatic polyols which may optionally be employed in preparing the novel polyurethane polymers of this invention should have a number average molecular weight ranging from about 62 to 350. Representative glycols include ethylene glycol; propylene glycol; trimethylene glycol; 1,2-butylene glycol; 1,3-butanediol; 1,4-butanediol; 1,5-pentanediol; 1,2-hexylene glycol; 1,10-decanediol; 1,2-cyclohexanediol; 2-butene-1,4-diol; 3-cyclohexene-1,1-dimethanol; 4-methyl-3-cyclohexene-1,1-dimethanol and 3-methylene-1,5-pentadiol.

Further examples of aliphatic polyols include alkylene oxide modified diols such as diethylene glycol; 3-(2-hydroxyethoxy) - 1 - propanol; 4 - (2 - hydroxyethoxy)-1-butanol; 5-(2-hydroxyethoxy) - 1 - pentanol; 3-(2-hydroxypropoxy)-1-propanol; 4-(2-hydroxypropoxy)-1-butanol; 5-(2-hydroxypropoxy) - 1 - pentanol; 1-(2-hydroxyethoxy)-2-butanol; 1-(2-hydroxyethoxy)-2-pentanol; 1-2 - hydroxymethoxy)-2-hexanol; 1-(2-hydroxyethoxy)-2-octanol; 1-(2-hydroxypropoxy)-2-butanol; 1-(2-hydroxypropoxy) - 2 - propanol; 1-(2-hydroxypropoxy)-2-hexanol and 1-(2-hydroxypropoxy)-2-octanol. Representative examples of ethylenically unsaturated low molecular weight diols include 3-allyloxy-1,5-pentanediol; 3-allyloxy-1,2-propanediol; 2-allyloxymethyl-2-methtyl-1,3-propanediol; 2-methyl-2-[(4-pentenyloxy)methyl] - 1,3 - propanediol; and 3-(o-propenylphenoxy)-1,2-propanediol; others are listed in U.S. Patents 2,927,098; 2,854,486. Represenative examples of low molecular weight polyols having at least 3 hydroxyl groups include: glycerol; 1,2,6-hexanetriol; 1,1,1-trimethylolpropane; 1,1,1-trimethylolethane; pentaerythritol; 3-(2-hydroxypropoxy)-1,2-propanediol, 6-(2-hydroxyethoxy) - 1,2 - hexanediol, 6-(2-hydroxypropoxy)-1,2-hexanediol; 2,4-dimethyl-2-(2-hydroxyethoxy) methylpentanediol-1,5; mannitol; galactitol; talitol; iditol; allitol; altritol; gulitol; arabitol; ribitol; xylitol; lyxitol; erythritol; threitol; 1,2,5,6-tetrahydroxyhexane; meso-inositol; sucrose; glucose; galactose; mannose; fructose; xylose; arabinose; dihydroxyacetone; glucose-α-methylglucoside; 1,1,1-tris[(2-hydroxyethoxy)methyl]ethane and 1,1,1-tris[(2-hydroxypropoxy)methyl]propane. Other examples are included in U.S. Patent 2,917,468. The aliphatic polyhydric compound is present only in minor proportions by weight of the polyol reactant, generally no more than about 10% by weight. Greater proportions are not desired because the increased degree of crosslinking which results lowers the tear resistance of the polyurethane product.

In preparing the novel polyurethane polymers of this invention, the proportions of reactants are preferably selected so as to provide about 0.8 to 1.1 total (i.e., primary and secondary) amine groups for every NCO-group supplied by the liquid polyisocyanate composition. The polyurethanes exhibit less satisfactory properties when proportions other than those recommended above are employed.

To make the cured polyurethane compositions of the present invention, one often deaerates the fluid NCO-terminated polyurethane for several minutes at 25–125° C. and thereafter adds the diamine curing agents. After all the reactants have been mixed, the fluid composition obtained is generally deaerated at temperatures from about 25 to 160° C. before being cast. This fluid composition eventually changes to a cured elastomeric solid. It is possible to add the diamine mixtures of the present invention and conduct a partial cure to obtain a "plastic gum." This plastic solid can be extruded or remolded and thereafter subjected to a final heating cycle to complete the cure. The higher the temperature, the shorter will be the pot life of the total composition and the total reaction time. Hindred diamines, that is diamines wherein there is a substituent adjacent to the amino group, are slower to react and make possible a longer pot life. Thus the pot life may be varied by those skilled in the art by empirical experiments wherein mixtures of hindered and free amines are tested. The incorporation of trialkyl amine catalysts such as triethylamine decreases the pot life and the total reaction time without affecting the quality of the ultimate cured polyurethane. Those skilled in the art can readily determine the pot life and the reaction conditions for a particular composition by empirical means. If desired, conventional pressures (for example, 400–600 lb./sq. in.) can be applied during the molding of films and the like.

When preparing the cured polyurethane polymers of this invention, it is desirable to maintain homogeneity from the time the reactants are mixed to the time when they have completely reacted to form the final cured polymer. Those skilled in the art can readily select mixing times and reaction temperatures suitable for this purpose. In general, any temperature between about 20° C. and 140° C. is suitable. At temperatures above 140° C. some degradation of the elastomer occurs; the vulcanizates obtained exhibit lower tear strength than those made below 140° C. At temperatures below 20° C. the reaction time is unduly prolonged. It is to be understood that the higher the reaction and cure temperature, the shorter the time needed. The reaction time can also be shortened by introducing small amounts of catalyst such as tertiary aliphatic amines; N,N,N',N'-tetramethyl-1,4-butane diamine is a representative example. Representative reaction time include the following: 2–2.5 hours at 120° C.; 20 hours at 105° C.; 24 hours at 100° C.

The fluid polyisocyanate composition contains an —NCO terminated polyurethane and, optionally, monomeric organic polyisocyanate. This composition is made by reacting a molar excess of an organic polyisocyanate with a polyether polyol and, obtionally, an aliphatic polyol compound. By "molar excess" is meant that the number of —NCO groups provided is greater than the number of —OH groups. If desired, the polyether polyol and the aliphatic polyol can be employed as a mixture, although it is to be understood that some or all of them may be separately reacted and the products blended to give the desired fluid NCO-terminated polyurethane composition. Agitation is normally used to provide thorough mixing of the reactant and to aid in the temperature control. This reaction is carried out at a temperature between about 25 and 150° C. for a period of ½ to several hours. In general, it is preferred to carry out the reaction at 80° C. for 4 hours. It is, of course, understood that the lower temperature require longer reaction times and at temperatures higher than about 100° C., a composition of increased viscosity may be obtained. If desired, the reaction may be carried out in more than 1 step. Thus a hydroxyl terminated polyurethane may be made by reacting the organic polyisocyanate with a molar excess of 1 or more polyols. This HO-terminated polyurethane in turn, may be reacted with an additional organic polyisocyanate or NCO-terminated polyurethane.

The cured polyurethane polymers of this invention can be prepared by carrying out part or all of the reaction between the above-described reactants in an inert solvent. By inert is meant a solvent which does not affect the desired course of the reaction. The solvent thus should be free from groups bearing Zerewitinoff-active hydrogen atoms (for example, hydroxyl groups, carboxyl groups, amino groups, amido groups, and mercapto groups). The cured polyurethane may be isolated from the solvent by conventional mechanical means such as spray drying, drum drying, or evaporation. Those skilled in the art can readily determine and select the solids content for a particular operation.

The cured polyurethane polymers of this invention have many varied applications. They are particularly useful for machine parts, potting and incapsulation of electronic equipment, and as a metal replacement. Among the many articles and uses to which these cured products are applicable may be mentioned the following: solid tires; mechanical goods, molded, lathe cut, stamped out, cast or dipped; such as grommets, sealing rings, channel rubbers, packing gaskets, mountings, matting (floor covering), tile, rolls, oil-well swabs, pipe-wipers, slush pump pistons, packers, tractor cleats, tank tread blocks, etc.; footwear, heels; coated fabrics of cotton, glass fibers, rayon, wool, polyacrylonitrile, polyester fibers, leather, paper, plastics; films in the form of sheeting, wrapping film, etc.; coating compositions for wood, metal, plastic, concrete, brick, ceramics, leather, etc.; cellular products which may be self-blown or expanded with a blowing agent for use as vibration dampers or shock absorbers.

The following examples will better illustrate the nature of the present invention; however, the invention is not intended to be limited to these examples. Parts are by weight unless otherwise indicated.

POLYMER A

Toluene-2,4-diisocyanate (278.7 parts, 1.6 moles) and anhydrous polytetramethylene ether glycol (number-average molecular weight 1,000) (1,000 parts, 1.0 mol) were agitated at 80° C. for 4 hours in a dry reaction vessel protected from atmospheric moisture. Polymer A thus obtained had a free NCO-group content of 4.2%, a Brookfield viscosity at 30° C. of about 16.500 c.p.s., and a number-average molecular weight of about 2,000.

POLYMER B

Toluene-2,4-diisocyanate (348.4 parts) and anhydrous polytetramethylene ether glycol (number-average molecular weight 1,000) (1,000 parts) were agitated at 80° C. for 4 hours in a dry reaction vessel protected from atmospheric moisture. Polymer B thus obtained had a free NCO-group content of 6.4%, a Brookfield viscosity at 30° C. of 6,000–7,000 c.p.s., and a number-average molecular weight of about 1,310.

Vulcanizate properties of the following examples were measured at the temperatures indicated in accordance with the following procedures:

| | ASTM Method |
|---|---|
| Shore A Hardness (25° C.) | D 676–58T. |
| Compression set (22 hrs., 70° C.) | D 395–55, Method B. |
| Tear strength (25° C.) | D 624. |

The modulus at 300% extension ($M_{300}$), tensile strength at the break ($T_B$), and the percent extension at the break ($E_B$) were measured on Scott dumbbells (ASTM Test Method D 412–51T) with an Instron testing machine set at a crosshead speed of 10 ins./min. and a load of 100 lbs.

*Example 1*

To Polymer B (50 parts), previously deaerated at 125° C. for 3 minutes, was added a mixture consisting of 4,4′-methylene-bis(2-chloroaniline) (5.1 parts) and N,N′-dimethyl-m-toluenediamine (2.1 parts). After the mixture thereby obtained had been stirred and deaerated at 125° C. for 2 minutes, it was poured into an open, hot mold and cured therein for 20 hours at 105° C. The total amine groups per NCO group was 0.85. The vulcanizate obtained displayed the following properties:

| | | |
|---|---|---|
| $M_{300}$ | lb./sq. in | 465 |
| $E_B$ | percent | 490 |
| $T_B$ | lb./sq. in | 4,800 |
| Shore A Hardness | | 74 |
| Compression set | percent | 60 |
| Tear strength | lb./in | 170 |

*Example 2*

To Polymer B (50 parts), previously deaerated at 125° C. for 3 minutes, was added a mixture consisting of 4,4′-methylene-bis(2-chloroaniline) (6.9 parts) and N,N′-di-sec-butyl-p-phenylene diamine (1.4 parts). This mixture was stirred and deaerated at 125° C. for 2 minutes, poured into an open, hot mold, and cured for 24 hours therein at 100° C. The total amine groups per NCO group was 0.9. The vulcanizate obtained displayed the following properties:

| | | |
|---|---|---|
| $M_{300}$ | lb./sq. in | 3,100 |
| $E_B$ | percent | 360 |
| $T_B$ | lb./sq. in | 4,800 |
| Shore A Hardness | | 94 |
| Compression set | percent | 36 |
| Tear strength | lb./in | 118 |

*Example 3*

The procedure of Example 2 above was followed using Polymer B (50 parts), 4,4′-methylene-bis(2-chloroaniline) (4.6 parts), and N,N′-di-sec-butyl-p-phenylenediamine (2.8 parts). The total number of amine groups per NCO group was 0.9. The vulcanizate obtained displayed the following properties:

| | | |
|---|---|---|
| $M_{300}$ | lb./sq. in | 2,900 |
| $E_B$ | percent | 340 |
| $T_B$ | lb./sq. in | 3,800 |
| Shore A Hardness | | 87 |
| Compression set | percent | 29 |
| Tear strength | lb./in | 100 |

*Example 4*

The procedure of Example 2 above was repeated using Polymer B (50 parts), 4,4′-methylene-bis(2-chloroaniline) (4.21 parts) and N-methyl-N′-isobutyl-p-phenylenediamine (2.78 parts). The total number of amine groups per NCO group was 0.9. The vulcanizate exhibited the following properties:

| | | |
|---|---|---|
| $M_{300}$ | lb./sq. in | 1,160 |
| $E_B$ | percent | 480 |
| $T_B$ | lb./sq. in | 5,100 |
| Shore A Hardness | | 71 |
| Compression set | percent | 29 |
| Tear strength | lb./in | 70 |

When N-methyl-N'-isobutyl-p-phenylenediamine was substituted by an equivalent amount of any of the following diamines, essentially the same results were obtained:

N,N'-dibenzyl-p-phenylenediamine;
N,N'-dihexyl-p-phenylenediamine;
N,N'-diisopropyl-p-phenylenediamine;
N,N'-di-sec-butyl-m-phenylenediamine;
N-isopropyl-N'-sec-butyl-p-phenylenediamine;
N,N'-di-sec-butyl-m-toluenediamine.

Example 5

The procedure of Example 2 was repeated using Polymer B (50 parts), 4,4'-methylene-bis(2-chloroaniline) (4.7 parts), and N,N'-diphenylethylenediamine (3.72 parts). The total number of amine groups per NCO group was 0.95. The vulcanizate exhibited the following properties:

$M_{300}$ ---------------------------- lb./sq. in-- 580
$E_B$ ------------------------------- percent-- 300
$T_B$ ------------------------------- lb./sq. in-- 3,700
Shore A Hardness ------------------------- 70
Compression set --------------------- percent-- 31
Tear strength ---------------------- lb./in-- 67

When the above procedure was repeated substituting an equivalent amount of any of the following diamines in place of N,N'-diphenyl-ethylenediamine, essentially the same results were obtained:

N,N'-diphenyl-2,3-butanediamine;
N,N'-di-o-tolyl-ethylenediamine;
N,N'-di-o-tolyl-1,4-xylyldiamine; and
1,4-bis-(phenylaminomethyl) mesitylene.

Example 6

To Polymer B (50 parts) previously deaerated at 125° C. for 3 minutes, was added a mixture consisting of 4,4'-methylene-bis(2-chloroaniline) (4.26 parts) and di-o-tolyl-ethylenediamine (4.95 parts). After the mixture had been stirred and deaerated at 125° C. for 2 minutes, it was poured into an open hot mold and cured at 120° C. for 2.5 hours. The total number of amine groups per NCO group was 0.9. The vulcanizate obtained displayed the following properties:

$M_{300}$ ---------------------------- lb./sq. in-- 3,200
$E_B$ ------------------------------- percent-- 330
$T_B$ ------------------------------- lb./sq. in-- 6,200
Shore A Hardness ------------------------- 75
Compression set --------------------- percent-- 13
Tear strength ---------------------- lb./in-- 75

Example 7

The procedure of Example 2 was repeated using Polymer B (100 parts), 4,4'-methylene-bis(2-chloroaniline) (9.52 parts) and methylene-bis-(N-methylaniline) (7.18 parts). The total number of amine groups per NCO group was 0.95. The vulcanizate properties were as follows:

$M_{300}$ ---------------------------- lb./sq. in-- 1,740
$E_B$ ------------------------------- percent-- 380
$T_B$ ------------------------------- lb./sq. in-- 6,900
Shore A Hardness ------------------------- 70
Compression set --------------------- percent-- 52
Tear strength ---------------------- lb./in-- 106

Example 8

The procedure of Example 2 above was repeated using Polymer B (50 parts), 4,4'-methylene-bis(2-chloroaniline) (4.26 parts), and N,N'-diphenylethylenediamine (3.37 parts). The total number of amine groups per NCO group was 0.9. The vulcanizate properties exhibited were as follows:

$M_{300}$ ---------------------------- lb./sq. in-- 2,100
$E_B$ ------------------------------- percent-- 370
$T_B$ ------------------------------- lb./sq. in-- 5,900
Shore A Hardness ------------------------- 67
Compression set --------------------- percent-- 5
Tear strength ---------------------- lb./in-- 75

Example 9

The procedure of Example 2 was repeated using Polymer B (50 parts), 4,4'-methylene-bis(2-chloroaniline) (2.13 parts), and N,N'-diphenylethylenediamine (4.96 parts). The total number of amine groups per NCO group was 0.9. The vulcanizate properties exhibited were as follows:

$M_{300}$ ---------------------------- lb./sq. in-- 1,125
$E_B$ ------------------------------- percent-- 360
$T_B$ ------------------------------- lb./sq. in-- 5,600
Shore A Hardness ------------------------- 65
Compression set --------------------- precent-- 11
Tear strength ---------------------- lb./in-- 50

Example 10

The procedure of Example 2 above was repeated using Polymer A (50 parts), 4,4'-methylene-bis(2-chloroaniline) (4.45 parts), and N,N'-diphenylethylenediamine (1.17 parts). The total number of amine groups per NCO group was 0.9. The following vulcanizate properties were obtained:

$M_{300}$ ---------------------------- lb./sq. in-- 900
$E_B$ ------------------------------- percent-- 440
$T_B$ ------------------------------- lb./sq. in-- 5,350
Shore A Hardness ------------------------- 69
Compression set --------------------- percent-- 15
Tear strength ---------------------- lb./in-- 40

Example 11

The procedure of Example 2 above was repeated using Polymer A (50 parts), 4,4'-methylene-bis(2-chloroaniline) (2.97 parts), and N,N'-diphenylethylenediamine (2.35 parts). The total number of amine groups per NCO group was 0.9. The vulcanizate exhibited the following properties:

$M_{300}$ ---------------------------- lb./sq. in-- 670
$E_B$ ------------------------------- percent-- 460
$T_B$ ------------------------------- lb./sq. in-- 5,600
Shore A Hardness ------------------------- 65
Compression set --------------------- percent-- 15
Tear strength ---------------------- lb./in-- 25

Example 12

The procedure of Example 2 above was repeated using Polymer A (25 parts), Polymer B (25 parts), 4,4'-methylene-bis(2-chloroaniline) (3.74 parts), and N,N'-diphenylethylenediamine (2.80 parts). The total number of amine groups per NCO group was 0.9. The vulcanizate exhibited the following properties:

$M_{300}$ ---------------------------- lb./sq. in-- 850
$E_B$ ------------------------------- percent-- 420
$T_B$ ------------------------------- lb./sq. in-- 6,000
Shore A Hardness ------------------------- 66
Compression set --------------------- percent-- 9
Tear strength ---------------------- lb./in-- 43

Example 13

The procedure of Example 2 above was repeated using Polymer B (50 parts), 4,4'-methylene-bis(2-chloroaniline) (3.39 parts), meta-toluenediamine (0.525 part), and N,N'-diphenylethylenediamine (3.58 parts). The total number of amine groups per NCO group was 0.9. The cured elastomer exhibited the following characteristics:

$M_{300}$ ---------------------------- lb./sq. in-- 1,730
$E_B$ ------------------------------- percent-- 380
$T_B$ ------------------------------- lb./sq. in-- 6,100
Shore A Hardness ------------------------- 68
Compression set --------------------- percent-- 12
Tear strength ---------------------- lb./in-- 80

Example 14

The procedure of Example 2 was repeated using Polymer B (50 parts), 4,4'-methylene-bis(2-chloroaniline) (2.71 parts), meta-toluenediamine (0.857 part), and N,N'-diphenylethylenediamine (3.58 parts). The total number of amine groups per NCO group was 0.9. The following data were obtained for the vulcanizate:

| | |
|---|---|
| $M_{300}$ lb./sq. in. | 1,900 |
| $E_B$ percent | 350 |
| $T_B$ lb./sq. in. | 5,000 |
| Shore A Hardness | 71 |
| Compression set percent | 12 |
| Tear strength lb./in. | 72 |

Example 15

The procedure of Example 2 was repeated using Polymer B (50 parts), 4,4'-methylene-bis(2-chloroaniline) (4.52 parts), N,N'-diphenylethylenediamine (3.58 parts) and diethylphthalate (an inert plasticizer, 5 parts). The total number of amine groups per NCO group was 0.9. Vulcanizate properties were as follows:

| | |
|---|---|
| $M_{300}$ lb./sq. in. | 850 |
| $E_B$ percent | 400 |
| $T_B$ lb./sq. in. | 2400 |
| Shore A Hardness | 60 |
| Compression set percent | 13 |
| Tear strength lb./in. | 23 |

Example 16

The procedure of Example 2 was repeated using Polymer B (50 parts), (0.076 mole NCO), 4,4'-methylene-bis(2-chloroaniline) (3.39 parts), castor oil (grade DB) (10 parts) (about 0.03 mole HO-groups), and N,N'-diphenylethylenediamine (4.42 parts) (total 0.0665 mole amino-groups). The total number of amine groups per NCO group was 0.9. The vulcanizate obtained showed the following characteristics:

| | |
|---|---|
| $M_{300}$ lb./sq. in. | 500 |
| $E_B$ percent | 490 |
| $T_B$ lb./sq. in. | 5000 |
| Shore A Hardness | 55 |
| Compression set percent | 16 |
| Tear strength lb./in. | 40 |

Example 17

To Polymer B (100 parts), previously deaerated at 125° C. for 3 minutes, was added N,N,N',N'-tetramethyl-1,3-butanediamine (0.5 part) catalyst. After the mixture had been stirred thoroughly for 1 minute, 24.3 parts of a mixture consisting of 37.5% by weight 4,4'-methylene-bis(2-chloroaniline) and 62.5% by weight N,N'-diphenylethylenediamine was added. After the mixture had been stirred vigorously for about 45 seconds, it was poured into open hot molds and cured at 100–120° C. for periods ranging from 50–120 minutes. The total number of amine groups per NCO group was 0.9. The vulcanizates obtained after the various cure cycles exhibited the following properties:

| Property | 120° C./ 90 min. | 100° C./ 120 min. | 100° C./ 50 min. |
|---|---|---|---|
| $M_{300}$ | 2,050 | 2,050 | 1,900 |
| $E_B$ | 380 | 340 | 360 |
| $T_B$ | 5,200 | 5,100 | 7,000 |
| Shore A Hardness | 68 | 68 | 67 |
| Compression Set | 26 | 23 | 27 |
| Tear Strength | 57 | 60 | 67 |
| Yerzley Resilience | 33 | 34 | 34 |

Example 18

The procedure of Example 2 above was repeated using Polymer A (100 parts), m-toluenediamine (2.71 parts), and N,N'-diphenylethylenediamine (4.7 parts). The total number of amine groups per NCO group was 0.9. The properties of the vulcanizate were as follows:

| | |
|---|---|
| $M_{300}$ lb./sq. in. | 1100 |
| $E_B$ percent | 470 |
| $T_B$ lb./sq. in. | 4400 |
| Shore A Hardness | 79 |
| Compression set percent | 28 |
| Tear strength lb./in. | 75 |

Example 19

To Polymer B (75 parts), previously deaerated at 125° C. for 3 minutes, was added N,N,N',N'-tetramethyl-1,3-butanediamine catalyst (0.3 part). After the mixture had been stirred thoroughly for one minute, 4,4'-methylenebis(2-chloroaniline) (5.4 parts) N,N'-diphenylethylenediamine (6.8 parts), and 1,1,1-trimethylolpropane (0.3 part) were added. The resulting composition was stirred vigorously for about 45 seconds, poured into a preheated slab mold, and cured therein for one hour at 120° C. The total number of amine groups per NCO group was 0.9. The vulcanizate obtained exhibited the following properties:

| | |
|---|---|
| $M_{300}$ lb./sq. in. | 1400 |
| $E_B$ percent | 400 |
| $T_B$ lb./sq. in. | 6800 |
| Shore A Hardness | 67 |
| Compression set percent | 23 |
| Tear strength lb./in. | 80 |
| Yerzley Resilience | 35 |

After this vulcanizate had been aged for one week at 121° C., it displayed the following properties:

| | |
|---|---|
| $M_{300}$ lb./sq. in. | 540 |
| $E_B$ percent | 530 |
| $T_B$ lb./sq. in. | 4800 |
| Shore A Hardness | 50 |
| Compression set percent | 61 |
| Tear strength lb./in. | 90 |
| Yerzley Resilience | 34 |

As many widely different embodiments of this invention may be made without departing from the spirit and scope thereof, it is to be understood that this invention is not limited to the specific embodiments thereof except as defined in the appended claims.

What is claimed is:

1. In a cured polyether polyurethane elastomer which is the reaction product of (I) an aromatic diamine, with (II) a liquid polyisocyanate composition being the reaction product of (a) a molar excess of at least one monomeric organic polyisocyanate free of isocyanate-reactive groups, and (b) at least one polyether having on the average about 2 to 3 HO-groups per molecule and a molecular weight of about 700 to 6000, said polyether selected from the group consisting of polyalkyleneether glycols, polyalkylene-aryleneether glycols, polyalkyleneether-thioether glycols, polyalkylene-aryleneether-thioether glycols, and polyalkylene ether triols; the improvement wherein said aromatic diamine (I) is a mixture of (1) at least one aromatic primary diamine, and (2) at least one aromatic secondary diamine whose secondary amino groups have one valence of each nitrogen atom attached to an aromatic ring and another valence attached to an aliphatic carbon atom, the molar ratio of (1) to (2) ranging from about 0.33:1 to 5.7:1.

2. An elastomer as defined in claim 1 wherein said polyether component (a) of said polyisocyanate composition (II) contains up to about 10 weight percent of at least one aliphatic polyhydric compound having from 2 to 8 hydroxyl groups and a molecular weight ranging from about 62 to 350.

3. An elastomer as defined in claim 1 wherein at least 65% of the free NCO-groups of said polyisocyanate composition (II) are reacted with said aromatic diamine (I)

and up to 15% of the NCO-groups of said polyisocyanate composition (II) are reacted with an aliphatic polyol.

4. An elastomer as defined in claim 3 wherein said polyether component (a) of said polyisocyanate composition (II) contains up to about 10 weight percent of at least one aliphatic polyhydric compound having from 2 to 8 hydroxyl groups and a molecular weight ranging from about 62 to 350.

5. A cured polyether polyurethane elastomer as defined in claim 1 wherein said aromatic primary diamine has the formula

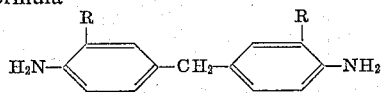

wherein R is selected from the group consisting of halogen, alkyl of not more than about 8 carbon atoms, and lower alkoxy.

6. A cured polyether polyurethane elastomer as defined in claim 3 wherein said aromatic primary diamine has the formula

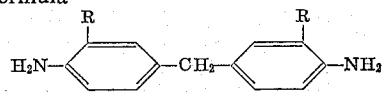

wherein R is selected from the group consisting of halogen, alkyl of not more than about 8 carbon atoms, and lower alkoxy.

7. A cured polyether polyurethane elastomer as defined in claim 1 wherein said aromatic primary diamine is 4,4'-methylene-bis(2-chloroaniline) and said aromatic secondary diamine is N,N'-diphenylethylenediamine.

8. A cured polyether polyurethane elastomer as defined in claim 3 wherein said aromatic primary diamine is 4,4'-methylene-bis(2-chloroaniline), said aromatic secondary diamine is N,N'-diphenylethylenediamine and said aliphatic polyhydric polyol reacting with the NCO-groups is castor oil.

References Cited by the Examiner
UNITED STATES PATENTS 2,929,800 3/60 Hill _____ 260—77.5
2,955,056 10/60 Knox _____ 260—2.5 XR
3,036,996 5/62 Kogon _____ 260—77.5

LEON J. BERCOVITZ, *Primary Examiner.*